(12) United States Patent
Mancher et al.

(10) Patent No.: US 10,752,379 B2
(45) Date of Patent: Aug. 25, 2020

(54) VIBRATION ABSORBING DEVICE FOR FLEXBEAMS

(71) Applicant: Sikorsky Aircraft Corporation, Stratford, CT (US)

(72) Inventors: Joshua Mancher, Stamford, CT (US); Lewis L. Kristie, Milford, CT (US); Marcus D. Cappelli, Shelton, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 16/165,380

(22) Filed: Oct. 19, 2018

(65) Prior Publication Data

US 2019/0047728 A1    Feb. 14, 2019

Related U.S. Application Data

(62) Division of application No. 14/844,873, filed on Sep. 3, 2015, now Pat. No. 10,112,729, which is a division of application No. 13/408,248, filed on Feb. 29, 2012, now Pat. No. 9,150,305.

(51) Int. Cl.
| | |
|---|---|
| *B64F 5/40* | (2017.01) |
| *B29C 53/42* | (2006.01) |
| *B64C 27/33* | (2006.01) |
| *B64C 27/51* | (2006.01) |
| *B64C 27/00* | (2006.01) |
| *B29C 65/48* | (2006.01) |
| *B29C 65/00* | (2006.01) |
| *B29L 31/08* | (2006.01) |

(52) U.S. Cl.
CPC ............... *B64F 5/40* (2017.01); *B29C 53/42* (2013.01); *B29C 65/48* (2013.01); *B29C 66/0326* (2013.01); *B64C 27/001* (2013.01); *B64C 27/33* (2013.01); *B64C 27/51* (2013.01); *B29L 2031/082* (2013.01); *Y10T 29/49826* (2015.01); *Y10T 428/31909* (2015.04)

(58) Field of Classification Search
None
See application file for complete search history.

(56) References Cited

U.S. PATENT DOCUMENTS

| | | | | |
|---|---|---|---|---|
| 2,440,664 | A | * | 4/1948 | Irons ..................... B29C 53/385 |
| | | | | 156/196 |
| 4,118,147 | A | | 10/1978 | Ellis |
| 4,284,443 | A | | 8/1981 | Hilton |

(Continued)

FOREIGN PATENT DOCUMENTS

| | | |
|---|---|---|
| DE | 2022873 A1 | 2/1971 |
| EP | 0033771 A2 | 8/1981 |
| GB | 2015956 A | 9/1979 |

OTHER PUBLICATIONS

Communication pursuant to Aricle 94(3) EPC issued in European Patent Application No. 12 199 474.3 dated Jun. 6, 2018, 8 pages.

(Continued)

*Primary Examiner* — Barbara J Musser
(74) *Attorney, Agent, or Firm* — Cantor Colburn LLP

(57) ABSTRACT

A replacement vibration absorbing device for replacing a wear wrap on a flexbeam includes a sleeve having a plurality of layers of vibration absorbing material, wherein an edge of the sleeve is cut so that the sleeve may be installed around a generally central portion of a flexbeam.

3 Claims, 6 Drawing Sheets

(56) References Cited

U.S. PATENT DOCUMENTS

| | | | |
|---|---|---|---|
| 4,680,071 A * | 7/1987 | Candle | B29C 35/02 |
| | | | 156/157 |
| 4,898,515 A | 2/1990 | Beno et al. | |
| 5,759,325 A | 6/1998 | Davis | |
| 5,820,344 A | 10/1998 | Hamilton et al. | |
| 6,565,969 B1 * | 5/2003 | Lamon | C09J 7/10 |
| | | | 428/349 |
| 7,927,077 B2 | 4/2011 | Olson | |
| 2002/0062546 A1 | 5/2002 | Obeshaw | |
| 2005/0227845 A1 * | 10/2005 | Merken-Schiller | |
| | | | B29C 53/043 |
| | | | 493/276 |
| 2006/0157901 A1 | 7/2006 | Vito | |
| 2008/0003106 A1 | 1/2008 | Kismarton et al. | |
| 2016/0052648 A1 | 2/2016 | Mancher et al. | |

OTHER PUBLICATIONS

European Search Report for application 12199474.3, dated Jul. 18, 2013, 7 pages.

* cited by examiner

VIBRATION ABSORBING DEVICE FOR FLEXBEAMS

CROSS-REFERENCE TO RELATED APPLICATIONS

This application is a divisional of U.S. patent application Ser. No. 14/844,873, filed Sep. 2, 2015, now U.S. Pat. No. 10,112,729, which is a divisional of U.S. patent application Ser. No. 13/408,248, filed Feb. 29, 2012, now U.S. Pat. No. 9,150,305, the disclosure of which is incorporated by reference herein in its entirety.

BACKGROUND OF THE INVENTION

This invention was made with Government support under Agreement No. W911W6-08-2-0006 for Rotor Durability Army Technology Objective (ATO). The Government has certain rights in the invention.

BACKGROUND OF THE INVENTION

This invention relates to helicopter rotors and, more particularly, to a helicopter rotor blade mounting assembly.

Rotor assemblies used in rotary-wing aircrafts include a rotor hub which mechanically couples a drive shaft to a plurality of rotor blades. Some of these assemblies include a flexible structural member, also referred to as a "flexbeam" for connecting the rotor blade to the rotor hub. A wear wrap is disposed around a central portion of the flexbeam to absorb vibration. During manufacturing of a flexbeam, a wear wrap is positioned and formed around the flexbeam through a complex multistep process; therefore when an aircraft is initially assembled, the flexbeams installed in a rotor assembly include a wear wrap that was fabricated at the factory.

Maintenance of the aircraft requires that these wear wraps be removed and replaced over time. Replacing a wear wrap in the field is difficult because of its complex manufacturing process and rigid dimensional requirements. FIG. 1 illustrates the current process mechanics use to replace a wear wrap in the field. Individual pieces of wear wrap material are added to each surface of the flexbeam separately. Because the wear wrap material must fit within a restricted dimensional envelope, mechanics spend a significant amount of time ensuring that each piece on each side of the flexbeam is the appropriate size and in the correct position.

BRIEF DESCRIPTION OF THE INVENTION

According to one embodiment of the invention, a vibration absorbing device is provided including a sleeve having a plurality of layers of vibration absorbing material. An edge of the sleeve is cut so that the sleeve may be installed around a generally central portion of a flexbeam.

According to another embodiment of the invention, a method of forming a replacement vibration absorbing device is provided including applying a layer of release material to a tool head. Multiple layers of vibration absorbing material are then wrapped over the release material. A border material is placed adjacent the vibration absorbing material and a uniform compression is then applied. The tool head is then cured and the vibration absorbing material is cut along an edge to allow for removal from the tool head.

According to yet another embodiment of the invention, a method of installing a replacement vibration absorbing device is provided including removing a previous wear wrap from a flexbeam. Adhesive is then applied to at least one surface of a replacement wear sleeve. The replacement wear sleeve is then attached to the flexbeam in the same position as the previous wear wrap.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
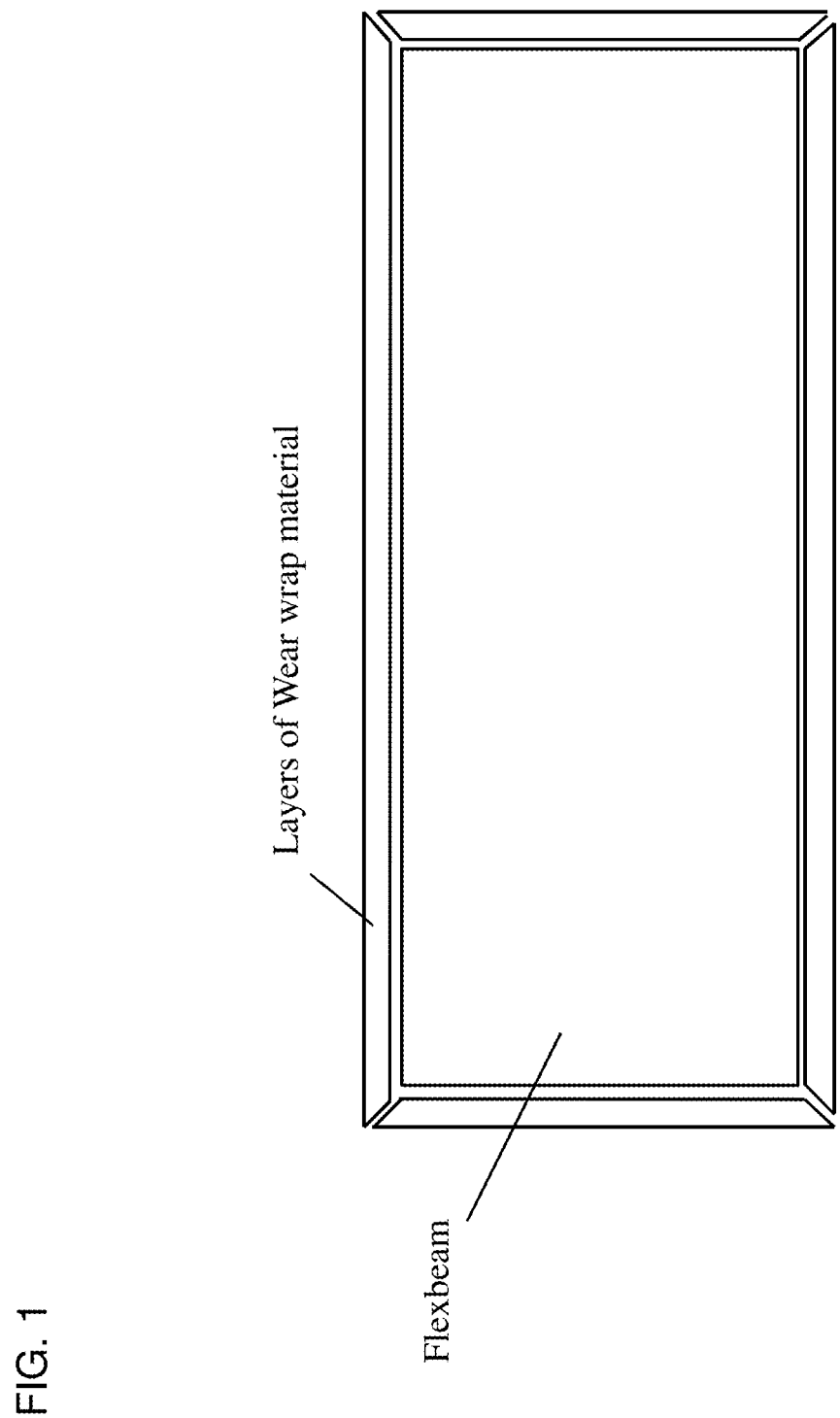
FIG. 1 is an exploded cross-sectional view of a flexbeam and a current replacement wear wrap installed in the field.
Figure 2:
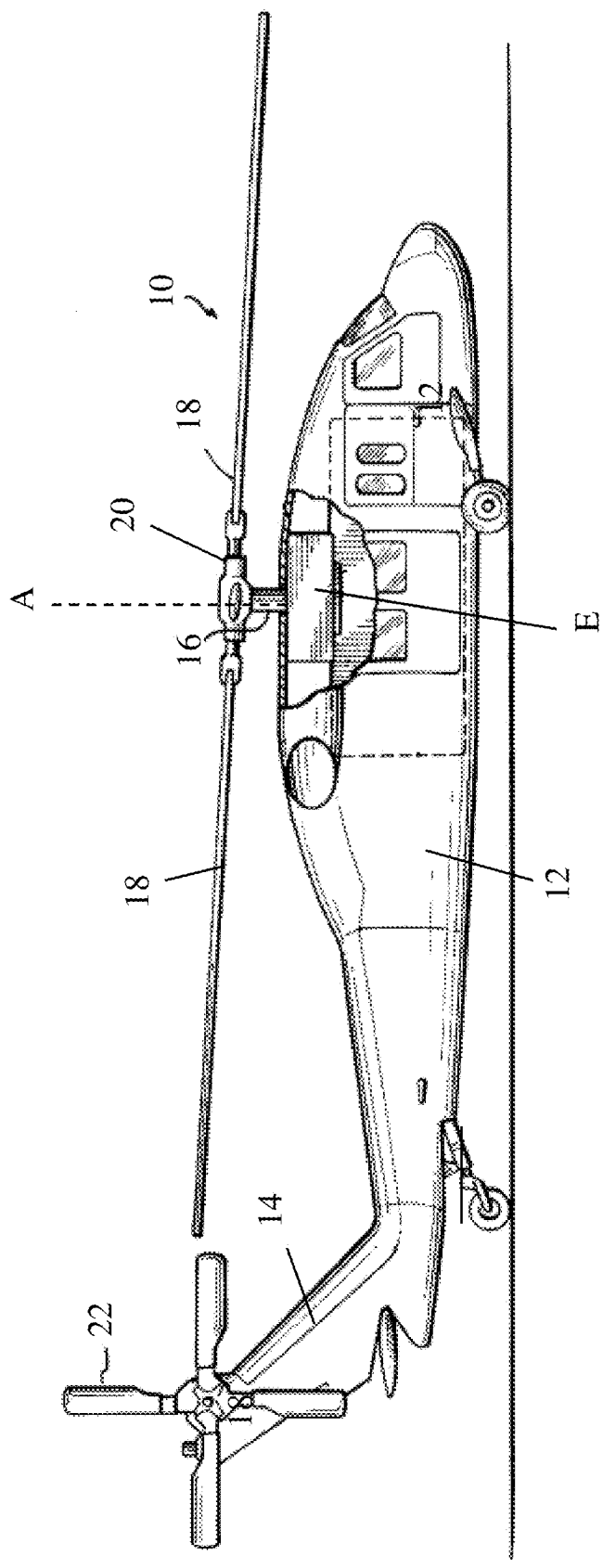
FIG. 2 is a perspective view of a rotary wing aircraft.
Figure 3:
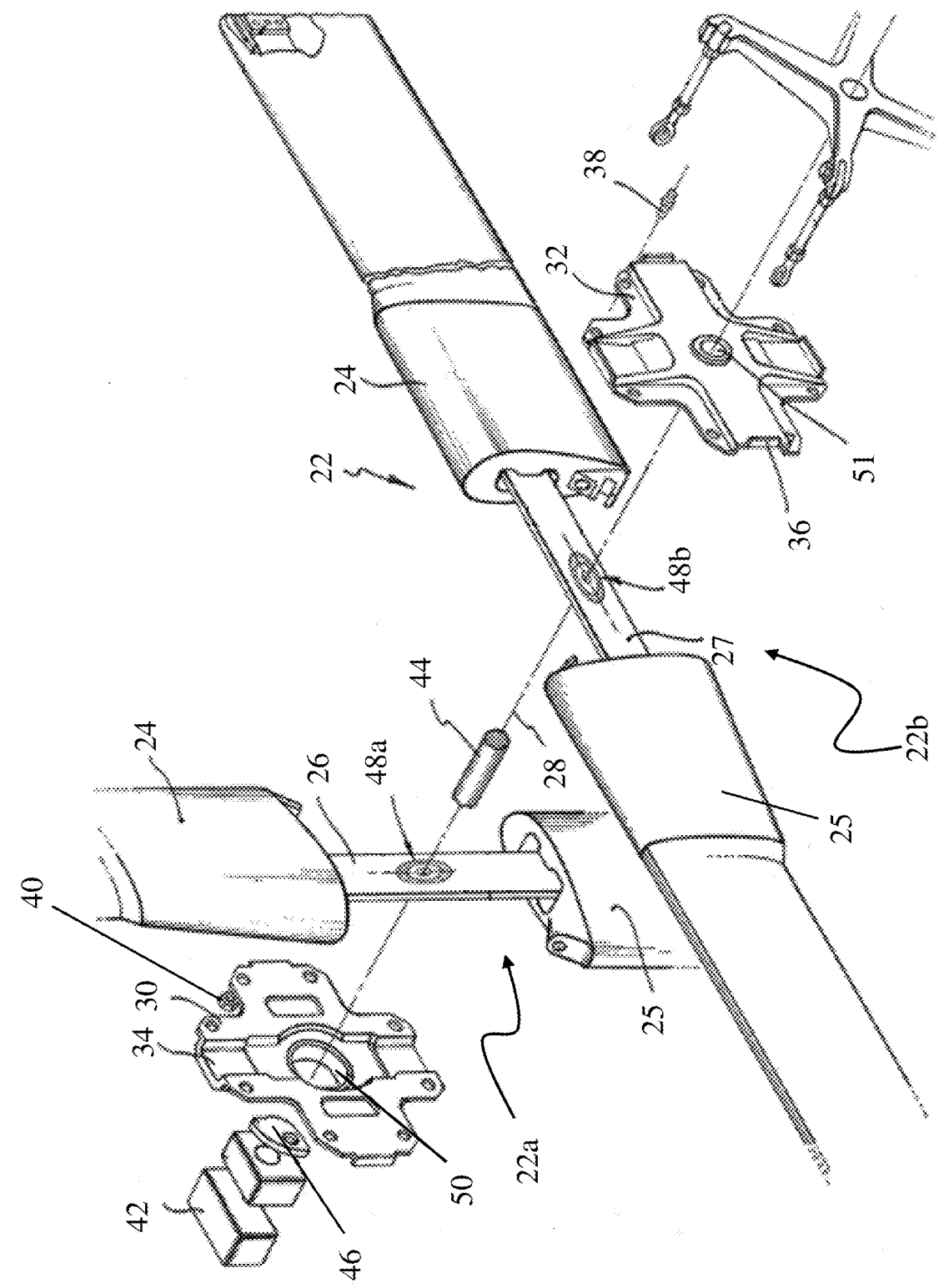
FIG. 3 is a partially exploded perspective view of a tail rotor assembly.

FIG. 2 schematically illustrates a rotary-wing aircraft 10 including a fuselage 12 having an extended tail 14. A main rotor assembly is mounted on the top of the airframe. The main rotor assembly 16 is driven about an axis of rotation A through a main gearbox by one or more engines E. The main rotor assembly 16 connects blades 18 to a rotor hub 20. Mounted to the tail 14 is a tail rotor assembly 22 which will be described in more detail in the following FIGS. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention FIG. 3 depicts a partially exploded perspective view of a tail rotor assembly 30. The tail rotor assembly 22 includes a first two-bladed rotor 22*a* and a second two-bladed rotor 22*b*, each consisting of blades 24 and 25, supported from opposite ends of a unidirectional composite plate-shaped flexbeam 26 and 27. Flexbeams 26 and 27 are identical. Rotors 22*a* and 22*b* are mounted at a right angle to one another and are drivingly rotatable about axis of rotation 28. Retention plate members 30 and 32 are positioned on opposite sides of rotors 22*a* and 22*b* and each includes a channel section 34, 36 to receive flexbeams 26 and 27 respectively and retain the flexbeams in juxtaposition to form the four-bladed tail rotor 22. Connecting means such as bolts 38 and nuts 40 pass through aligned holes in retention plates 30 and 32 to retain the plates, flexbeams, and blades in position. A conventional gearbox 42 is preferably mounted in or on the helicopter fuselage to drive the tail rotor assembly 22 about axis 28. The tail rotor assembly 22 is coupled to the drive shaft 44 by a coupling means 46. The drive shaft 44 extends through flexbeams 26, 27 and through floating centering members 48a, 48h therein, whose centers are aligned with corresponding apertures 50, 51 in retention plates 30, 32.

Figure 4:
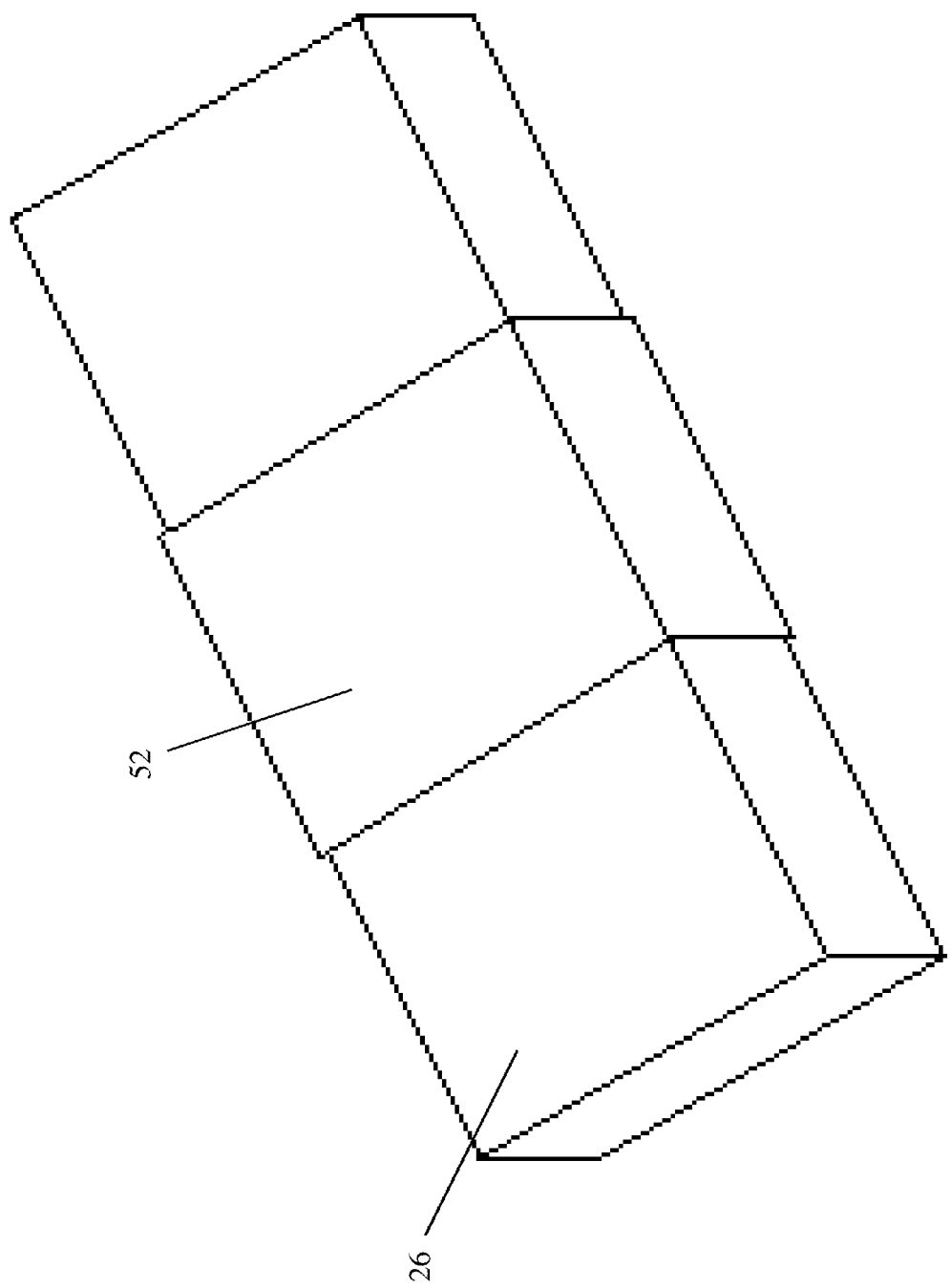
FIG. 4 is a perspective view of a flexbeam having a wear wrap.

FIG. 4 is a detailed view of a central portion of the flexbeam 26 or 27 in FIG. 3. As illustrated in FIG. 4, the centralized portion of a flexbeam 26 is generally rectangular in shape and has a generally rectangular cross-section. A wear wrap 52 is manufactured around a portion of the flexbeam 26 to absorb vibration. The wear wrap 52 includes multiple layers of a vibration absorbing material, such as nylon for example. The tolerances for the width of the wear wrap 52 and the position of the wear wrap 52 relative to the flexbeam 26 are very small. Additionally, the thickness of the flexbeam 26 and wear wrap assembly 52 has a limited tolerance such that the surface of the wear wrap 52 may be sanded down to fit within the desired thickness range.

Figure 5:
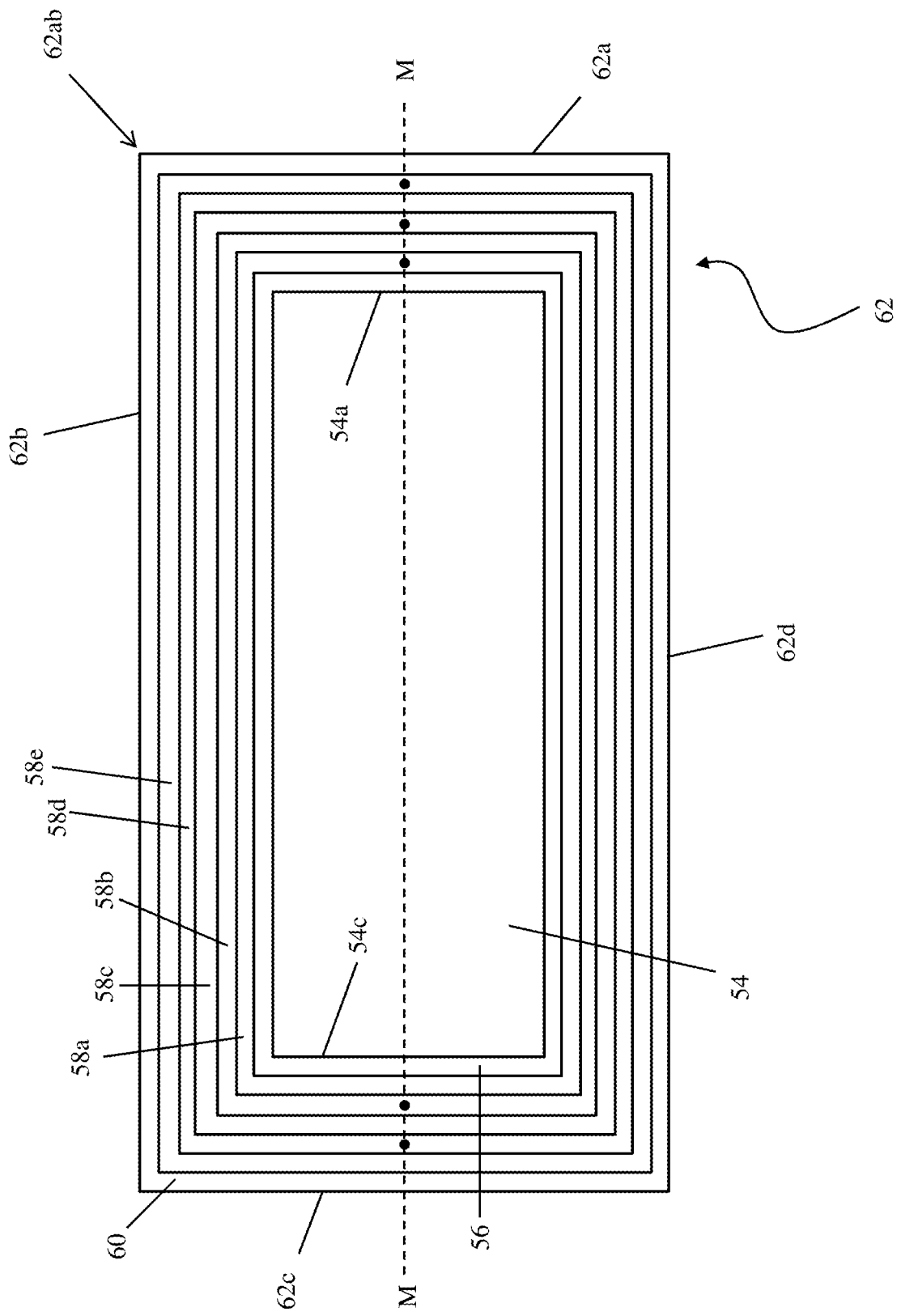
FIG. 5 is a cross-sectional view of the center of a tool head while manufacturing a replacement wear sleeve according to an embodiment of the present invention.
Figure 6:
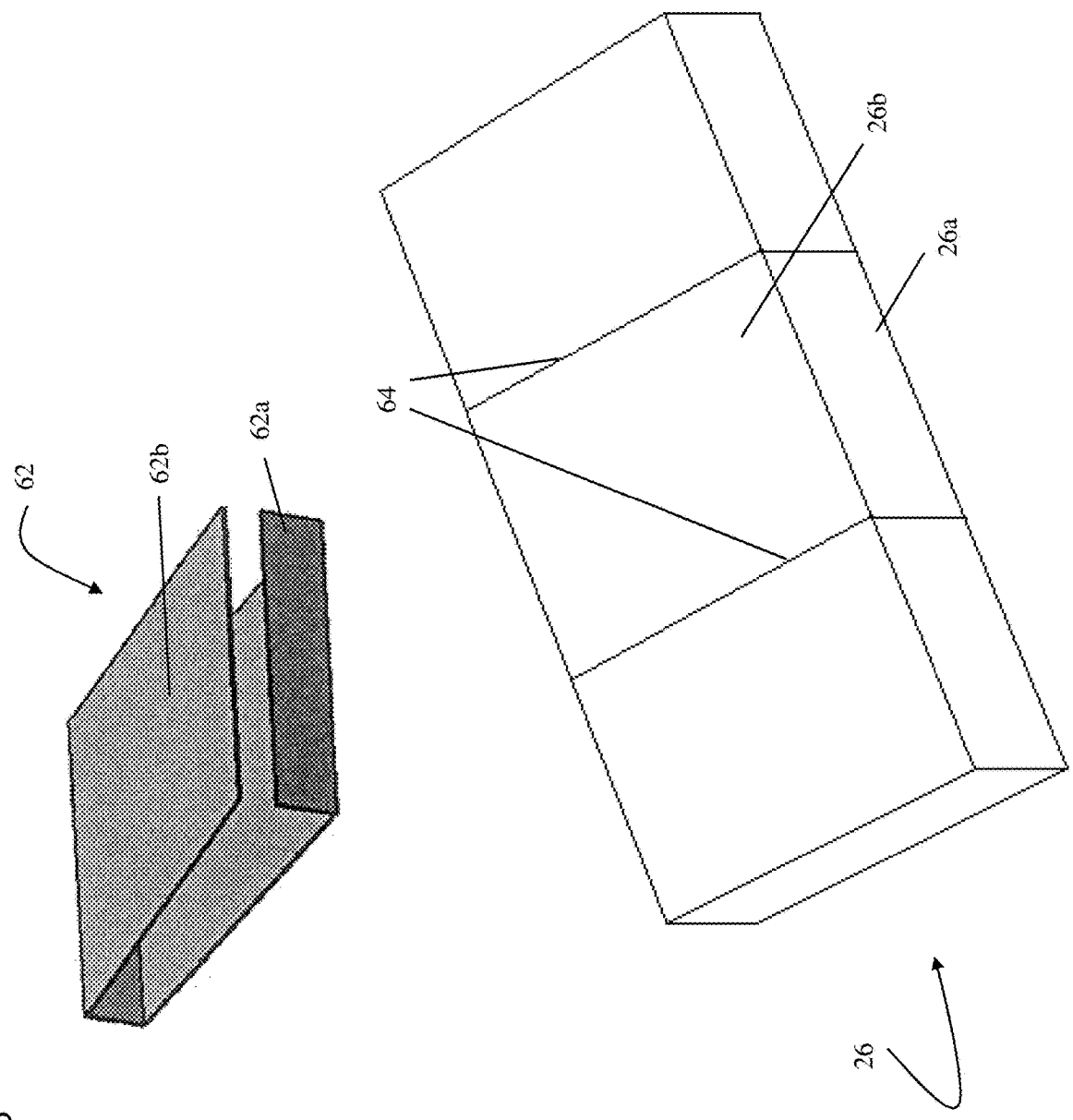
FIG. 6 is a perspective view of a flexbeam and a corresponding replacement wear sleeve according to an embodiment of the present invention.

Referring now to FIGS. 5-6, a replacement wear sleeve 62 is provided for installation around a centralized portion of a flexbeam 26. A replacement wear sleeve 62 is manufactured in a manner similar to a wear wrap 52 using a bare flexbeam or a tool head 54 having the same dimensions and traced guidelines 64 (FIG. 6) as a flexbeam 26. First, a layer of a release material 56, such as fluoropeel tape for example, is applied to the tool head 54, to prevent the sleeve 62 and adjacent material from adhering to the surface of the tool head 54. Overlapping layers of vibration absorbing material 58 are then wrapped over the portion of the release material 56 between traced dimensional guidelines 64. One possible vibration absorbing material 58 that may be used is nylon. In an exemplary embodiment, five continuous layers of vibration absorbing material 58 of equal thickness are applied. A first layer 58a starts and ends at midpoint M of a first side 54a of the tool head 54. The next layer 58b starts and ends at the midpoint M of second side 54c, opposite the first side 38a. The layers 58c-58e continue to start on alternating sides of the flexbeam until all layers of the vibration absorbing material 58 are wrapped. Start and end points of each layer of vibration absorbing material 58 are illustrated by a dot. Replacement wear sleeve 62 may include any number of layers and a variety of layer configurations such that the above description is non-limiting.

After layering the vibration absorbing material 58, a border material, such as aluminum tape for example, is then wrapped over the release material 56 adjacent the left and right sides of the vibration absorbing material 58 to prevent movement of the vibration absorbing material 58. A peel ply 60 is placed over the border material and the vibration absorbing material 58, and the tool head 54 is then inserted into a vacuum bag. In an exemplary embodiment, a layer of bleeder cloth is inserted between the peel ply and the surface of the vacuum bag to provide a continuous air path for the vacuum. A port extends through a surface of the vacuum bag for connecting to a vacuum. Suction from the vacuum applies a uniform compression force over the surface of the tool head 54, thereby eliminating any buildup between the layers, including any bubbles or wrinkles. After suction is complete, the tool head 54 may either be inserted into a press or an autoclave for curing.

In one embodiment, the tool head 54 is inserted into a press after the vacuum bag and the peel ply 60 are removed. In an alternate embodiment, the tool head 54 may be cured using an autoclave. In this instance, the tool head 54 is not removed from the vacuum bag and the peel ply is not removed from the tool head 54 until curing is finished. The tool head 54 is cured at an appropriate temperature for an appropriate length of time based on the curing machine, the vibration absorbing material 58 and the application. Curing of the tool head 54 forms a replacement wear sleeve 62 having two opposing side surfaces 62a, 62c adjacent sides 54a, 54c of the tool head 54, and a top and bottom surface 62b and 62d. To remove the sleeve 62 from the tool head 54, a cut is made along an edge of the sleeve 62, for instance edge 62ab. The edge of the sleeve 62 may be cut using a razor blade, knife, or any other cutting means.

The process of installing a replacement wear sleeve 62 on a flexbeam 38 in the field is simple and efficient. After removing the previous wear wrap 52 from the surface of the flexbeam 26, adhesive is applied to at least one surface of the replacement sleeve 62 that will contact the flexbeam 38. In one example, adhesive will be applied evenly to all inside surfaces of the replacement sleeve 62. In an exemplary embodiment, the adhesive used is a paste adhesive having a scrim additive. Because a replacement wear sleeve 62 has the same dimensions as a wear wrap 52, the replacement sleeve 62 is easily located around the flexbeam. 26 in the same position where the wear wrap 52 was located. Dimensional guidelines 64 traced on the flexbeam 26 assist mechanics in placing the replacement sleeve 62 in the correct position. Because the replacement sleeve 62 is a single piece, it is easy to position around the flexbeam 26. When in place, section 62a of sleeve 62 contacts a side 26a of the flexbeam 26, and the top surface 62b of sleeve 62 is adjacent a surface 26b of the flexbeam 26. Once attached to the flexbeam 26, the sleeve 62 may be sanded to fit within the required dimensional constraints. This simple installation method will significantly reduce the maintenance hours spent replacing each wear wrap 52 of a flexbeam 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of installing a replacement vibration absorbing device comprising:
   removing a previous wear wrap from a flexbeam;
   applying adhesive to at least one surface of a replacement wear sleeve, wherein said replacement wear sleeve has a hollow interior within which a central portion of the flexbeam is received, and the replacement wear sleeve includes a plurality of layers of vibration absorbing material having a cut edge such that a portion of the sleeve is movable to provide access to the hollow interior; and
   locating the replacement wear sleeve on the flexbeam in the same position as the previous wear wrap.

2. The method of installing a replacement vibration absorbing device according to claim 1, wherein the replacement wear sleeve is located using a dimensional guideline on the flexbeam.

3. The method of installing a replacement vibration absorbing device according to claim 1, wherein the adhesive is an adhesive paste having a scrim additive.

* * * * *